United States Patent
Durth et al.

(10) Patent No.: US 10,411,439 B2
(45) Date of Patent: Sep. 10, 2019

(54) SURGE ARRESTER

(71) Applicant: Phoenix Contact GmbH & Co. KG, Blomberg (DE)

(72) Inventors: Rainer Durth, Horn-Bad Meinberg (DE); Jan-Erik Schmutz, Detmold (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 354 days.

(21) Appl. No.: 15/314,194

(22) PCT Filed: May 26, 2015

(86) PCT No.: PCT/EP2015/061576
§ 371 (c)(1),
(2) Date: Nov. 28, 2016

(87) PCT Pub. No.: WO2015/181158
PCT Pub. Date: Dec. 3, 2015

(65) Prior Publication Data
US 2017/0187169 A1   Jun. 29, 2017

(30) Foreign Application Priority Data

May 26, 2014 (DE) .......................... 10 2014 107 409

(51) Int. Cl.
*H01T 1/02* (2006.01)
*H02H 9/06* (2006.01)
(Continued)

(52) U.S. Cl.
CPC .................. *H01T 1/02* (2013.01); *H01T 1/10* (2013.01); *H01T 1/15* (2013.01); *H01T 2/02* (2013.01); *H01T 4/10* (2013.01); *H02H 9/06* (2013.01)

(58) Field of Classification Search
CPC .... H01T 1/02; H01T 1/10; H01T 1/15; H01T 2/02; H01T 4/10; H02H 9/06
(Continued)

(56) References Cited

U.S. PATENT DOCUMENTS 3,614,536 A * 10/1971 Johansson ................. H01T 1/04
                                                                        315/36
4,198,590 A    4/1980 Harris
(Continued)

FOREIGN PATENT DOCUMENTS

DE      103 38 835 A1    3/2005
EP      0 439 229 A1     1/1991
(Continued)

*Primary Examiner* — Zeev V Kitov

(74) *Attorney, Agent, or Firm* — David S. Safran; Roberts Mlotkowski Safran Cole & Calderon, P.C.

(57) ABSTRACT

A surge arrester for the power supply of low-voltage systems, having a housing, two electrodes which are situated axially opposite one another, an arc combustion chamber formed in the interior of the housing, and a trigger aid. A spark gap is formed between the two electrodes so that an arc is produced when the spark gap between the two electrodes is triggered, the axial distance between end faces of the two electrodes being so large that the arc voltage is greater than the expected line voltage. Conversion of energy within the surge arrester is reduced by the arc combustion chamber having an inner region and at least one expansion region into which the arc can propagate after triggering. The inner region is arranged between the two electrodes and is delimited axially by the end faces of the electrodes and is delimited longitudinally by the at least one expansion region.

10 Claims, 6 Drawing Sheets

(51) Int. Cl.
*H01T 1/10* (2006.01)
*H01T 1/15* (2006.01)
*H01T 2/02* (2006.01)
*H01T 4/10* (2006.01)

(58) Field of Classification Search
USPC .................................................. 361/1, 12, 14
See application file for complete search history.

(56) References Cited

U.S. PATENT DOCUMENTS

| | | | |
|---|---|---|---|
| 4,345,295 A * | 8/1982 | Hasse | H01T 1/10 |
| | | | 313/231.11 |
| 4,485,334 A | 11/1984 | de Witte | |
| 5,216,325 A * | 6/1993 | Patel | F42C 19/06 |
| | | | 313/308 |
| 8,227,989 B2 * | 7/2012 | Kim | H01T 2/02 |
| | | | 313/234 |
| 2011/0156582 A1 * | 6/2011 | Haacke | H01J 9/247 |
| | | | 313/638 |
| 2011/0216456 A1 | 9/2011 | Yamamoto et al. | |
| 2013/0208388 A1 * | 8/2013 | Ehrhardt | H01T 4/14 |
| | | | 361/137 |

FOREIGN PATENT DOCUMENTS

| | | |
|---|---|---|
| JP | 2005-116192 A | 4/2005 |
| WO | 2009/028881 A2 | 3/2009 |

* cited by examiner

SURGE ARRESTER

BACKGROUND OF THE INVENTION

Field of the Invention

The invention relates to a surge arrester for use in the power supplies of low-voltage systems, of the type in which the surge arrestor has a housing, a pair of electrodes which are situated axially opposite one another, an arc combustion chamber which is formed in the interior of the housing, and a trigger aid. A spark gap is formed between the two electrodes, so that an arc is produced when the spark gap between the two electrodes is triggered, and the axial distance between end faces of the two electrodes is selected to be so large that the arc voltage is greater than the expected line voltage.

Description of Related Art

When surges that exceed the upper tolerance limit of the respective nominal voltage occur, the affected devices, facilities, and cables must be short-circuited with equalization of potential in as short a time as possible. Various components are used for this purpose, depending on the operating site (protected area) and types of the devices and facilities to be protected. The individual components differ thereby essentially in their response behavior and their discharge capacity.

In low-voltage systems, surge arresters are often employed that are based on spark gaps to protect against surges—that is, surge arresters whose essential component is a spark gap that activates at a certain excess voltage, whereby an arc is produced when the spark gap between the two electrodes is triggered. As surge arresters with spark gaps are also employed to protect against lightning strikes, very high and steeply increasing currents with values into the three-digit kA-range can flow over the spark gap.

Surge arresters with a spark gap as an arrester have, indeed, the advantage of a high surge-current load capacity; however, they also have the disadvantage of a response voltage that is relatively high and also not especially constant. For this reason, various types of trigger aids have already been used for a long time to trigger spark gaps. With the help of these trigger aids, the response voltage of the spark gap or the surge arrester is reduced.

When the spark gap is triggered via the arc in surge arrestors of the type in question—with or without the use of a trigger aid—a low-impedance connection is created between the two electrodes, over which the high-energy transient surge current to be discharged (deliberately) flows. When connected to a line voltage, however, an undesired system follow current can also flow over this low-impedance connection, which can lead to the destruction of an upstream fuse. The device or the facility is thus indeed protected from destruction by surge, but the device or facility will not be available until the ruined fuse has been replaced.

As a consequence, one important requirement of modern surge arresters calls for extinguishing the arc as quickly as possible after a completed discharge process so that the system follow current is also terminated or suppressed. As a general rule, this involves attempting to increase the arc voltage (that is, the voltage that must be present between the two electrodes for the arc to continue to burn) so much that any system follow current that arises is suppressed or reduced.

One possibility for increasing the arc voltage entails increasing the arc length after the spark gap reacts. Another possibility for increasing the arc voltage after the discharge process entails cooling the arc via the cooling action of insulating-material walls as well as the use of gas-emitting insulating material. Further known methods for increasing the arc voltage are arc multiplication (that is, splitting the one arc into multiple arcs by installing quenching plates) and restricting the arc to a narrow gap between the two electrodes. Additionally, combinations of the previously described methods are also possible.

The method of increasing the arc voltage by cooling the arc (by means of, for example, a gas-emitting insulating material) is thereby relatively strongly dependent on the level and the duration of the surge current to be discharged. Very high surge currents lead to a strong blowing of the arc through the gas-emitting insulating material walls such that high surge currents of this kind, with high conversions of energy, normally lead to a quick suppression of system follow currents. In the case of a lower surge current, on the other hand, the blowing of the arc caused by the surge current itself can, in some circumstances, fail to lead to a sufficient increase in the arc voltage, so that suppression of the line follow current takes place belatedly.

The increase of the arc voltage (desired for the suppression of a system follow current) has thereby—regardless of the method implemented to increase the arc voltage—the disadvantage that, due to the increased arc voltage during the discharge of the surge current, it can lead to an increased conversion of energy inside of the surge arrester, especially inside of the arc combustion chamber of the surge arrester. This leads to problems, especially with largely closed surge arresters (that is, encapsulated, non-exhausting surge arresters), as the energy converted into heat can only leave the arc combustion chamber relatively slowly, so that the materials surrounding the arc combustion chamber are exposed to very high temperatures over a relatively long period of time. The insulating materials used for blowing and cooling the arc are in this process especially vulnerable. Furthermore, the surge arresters must also be capable of withstanding the high pressures that arise during discharge of a surge current, which requires expensive structures.

A surge arrester as previously described is known from German Patent Application DE 103 38 835 A1. In this surge arrester, a system follow current is prevented in that the distance between the two electrodes is selected to be so large that the arc voltage is greater than the expected line voltage. To ensure that the response voltage of this surge arrester is not too great due to the relatively large distance between the two electrodes of the spark gap, a triggering aid is provided, by means of which the desired response voltage of the surge arrester can be adjusted.

In the surge arrester known from German Patent Application DE 103 38 835 A1, the cylindrical arc combustion chamber has a relatively small diameter, which corresponds to the diameters of the free end faces of the electrodes which are situated opposite each other. Furthermore, the arc combustion chamber is almost completely surrounded by an insulating material, which leads to a cooling as well as a constriction of the arc. Both lead—as previously described—to a desired increase in the arc voltage, but also to a high conversion of energy inside of the arc combustion chamber.

In order to purge the heat that forms after the triggering of the arc inside of the arc combustion chamber, the known surge arrester has cooling channels formed in its housing, which cooling channels are linked to the arc combustion chamber. In this manner, the hot, ionized gases produced in the arc combustion chamber during the discharge process by the arc can be purged out of the arc combustion chamber and ultimately also out of the housing. In order to ensure that the temperature of the gases flowing out of the housing is not too high, the cooling channels must be designed such that they provide a sufficiently long path for the plasma in the housing to travel along. In the surge arrester known from German Patent Application DE 103 38 835 A1, this is accomplished in that the metallic housing is formed with two parts and the two housing halves are arranged coaxially to each other. Between the two housing halves, two helical cooling channels are thereby formed, which cooling channels together serve to screw the two housing halves together and through which the plasma can also simultaneously flow.

Control of the high pressures and temperatures produced in the known surge arrester imposes very tough design requirements on the housing and the materials surrounding the arc combustion chamber. In particular, the wall thicknesses of the two housing parts must be relatively high to guarantee sufficient mechanical stability, which leads to a respectively increased outer diameter of the housing.

SUMMARY OF THE INVENTION

Therefore, the object of the present invention is therefore to further develop a surge arrester as described at the outset in such a way that the previously mentioned disadvantages are, as far as possible, avoided. In particular, one achievement should be that the conversion of energy inside of the surge arrester is, during discharge of the surge current, as small as possible, whereby a system follow current is extinguished as quickly as possible or the occurrence of a system follow current is prevented.

This object is accomplished by the surge arrester of the described at the outset which is improved in that the arc combustion chamber has an inner region and at least one expansion region into which the arc can propagate after triggering. The inner region is arranged between the two electrodes, which are situated opposite one another, and is axially delimited by the end faces of the two electrodes, wherein the at least one expansion region adjoins a longitudinal side of the inner region, and wherein at least two side walls of the expansion region are at least partially composed of insulating material.

In contrast to the surge arrestor known from German Patent Application DE 103 38 835 A1, in which the arc combustion chamber is only formed between the two end faces of the electrodes which are situated opposite one another and is essentially cylindrically closed (that is, it only has one inner region), the arc combustion chamber in the surge arrester according to the invention additionally has at least one expansion region into which the arc can propagate. The arc combustion chamber has, consequently, a significantly larger volume, whereby the arc can propagate not only in the axial direction of the arc combustion chamber but also perpendicular to the axis of the arc combustion chamber—that is, perpendicular to the connecting line between the two electrodes which are situated opposite one another. As a result, the arc can expand depending on the instantaneous current strength of the surge current to be discharged and can do so in such a way that it takes the most energetically favorable form in each case, so that the arc voltage during rise in the amplitude of the surge current does not increase or only relatively slightly increases. In this way, an approximate linearization of the arc voltage during the discharge process is achieved, whereby the chosen, relatively large axial distance between the end faces of the two electrodes and the configuration of the arc combustion chamber ensure that the arc voltage lies above the expected line voltage.

When a surge current is discharged via the triggered spark gap, an arc that is present normally causes gas to be emitted from the insulating material which surrounds the arc combustion chamber, which leads to a cooling of the arc and hence to an increase in the arc voltage. Because the arc combustion chamber in the surge arrester according to the invention has, in addition to a narrow inner region, at least one adjoining expansion region, the arc can propagate into this expansion region, which leads to an increase in the volume surrounding the arc and thus to a lesser cooling of the arc. This, in turn, leads to a lesser increase in the arc voltage, which leads to the desired reduction in the conversion of energy inside of the arc combustion chamber of the surge arrester. A further-reduced load is achieved because the energy released from the arc simultaneously scatters not just into the volume of the inner region of the arc combustion chamber but also into a volume increased by the volume of the expansion region. This also leads to less damage to the insulating material which at least partially surrounds the arc combustion chamber or to the side walls comprised of insulating material.

By designing the arc combustion chamber with at least one expansion region, into which the arc can propagate, wherein at least two side walls of the expansion region are at least partially composed of insulating material, an insulation gap bounded by insulating material is formed which has a substantial extension perpendicular to the connecting line between the two electrodes which are situated opposite one another, whereby this extension is preferably substantially larger than the corresponding extensions of the end faces of the two electrodes.

According to one embodiment of the invention, the arc combustion chamber has two expansion regions, which adjoin two longitudinal sides of the inner region—that is, an expansion region is adjacent to both longitudinal sides of the inner region. As a consequence, the arc can possibly propagate into either one of the two expansion regions. Additionally, it is possible for the arc to split into both expansion regions. If the arc combustion chamber has two expansion regions, then both expansion regions should preferably essentially have the same dimensions, so that the inner region is essentially arranged centrally in the arc combustion chamber. This kind of symmetrical configuration of the arc combustion chamber, in which the two electrodes that are situated opposite one another are arranged in the middle of the arc combustion chamber and thus also centrally between the insulation gap, leads to an especially good linearization of the arc voltage and thus to a reduced conversion of energy inside of the arc combustion chamber.

According to an alternative embodiment of the invention, the arc combustion chamber has only one expansion region which adjoins only one longitudinal side of the inner region. The longitudinal side of the inner region situated opposite the expansion region is, by contrast, closed, so that the arc can only propagate in one direction. With this variant of the invention, in which the two electrodes are arranged on one side of the arc combustion chamber, a compact design of the surge arrester is made possible.

To enable the arc to, after the spark gap is triggered and while the surge current is being discharged, propagate or expand in such a manner that it burns as much as possible in its energy minimum, the expansion region preferably has a height H which is greater than the height h of the inner region and thus also greater than the corresponding extension of the end faces of the electrodes. The height H of the expansion region is preferably at least twice as big, especially three times as big as the height h of the inner region.

According to a further advantageous configuration of the invention, the expansion region has a length which is greater than the length of the inner region—that is, the length of the expansion region is greater than the distance between the end faces of the two electrodes. At least one electrode thus extends not only with its end face but also with a corresponding length into the arc combustion chamber so that the electrode adjoins the expansion region with one of its longitudinal sides. A symmetrical arrangement of the electrodes in the arc combustion chamber is preferably created here, so that the two electrodes extend equally far into the arc combustion chamber. As a result, it is possible for the bottoms of the arc to wander outwardly on the longitudinal side of both electrodes after triggering. As a result, the length of the arc is extended, which leads to an increase in the arc voltage. Because the arc simultaneously wanders, however, out of the narrow inner region, constriction of the arc is avoided, which would otherwise likewise lead to an increase in the arc voltage. Ultimately, the arc can expand so much in the expansion region, in which the arc, due to the greater volume, is less strongly cooled, that the arc takes on its most energetically favorable form, so that the arc voltage remains approximately constant as a result.

Altogether, there are a multitude of possibilities as to how the arc combustion chamber can be structurally and geometrically configured. According to a preferred embodiment example, the expansion region is configured such that it extends, in cross section, outwardly from the inner region. The expansion region consequently has a smaller width in the region in which it adjoins the inner region of the arc combustion chamber—that is, a lesser extension perpendicular to the connecting line between the two electrodes—than it would have in a region separated from the inner region. The extension of the expansion region can thereby be linear, so that the expansion region has a somewhat V-shaped cross section, or nonlinear—for example, arched or in steps.

According to a further preferred configuration of the invention, the side walls of the expansion region are configured such that the expansion region has a region in which the distance between the side walls is reduced—that is, the expansion region has a bottleneck. As a result, the arc is more strongly constricted and more strongly cooled by the neighboring side walls when it runs through the bottleneck. If the bottleneck is confined to a small region which has only one limited height, the arc will tend to run outside of the bottleneck in order to avoid constriction and thus undergo stronger cooling. The bottleneck is thereby preferably envisioned to be arranged centrally in an axial direction between the two electrodes, so that the arc is symmetrically widened. The previously described bottleneck can, for example, be created by configuring the side walls of the expansion region at least partially spherically, so that the expansion region has, at least in certain areas, a concave cross section.

According to an alternative configuration, the region in which the distance between the side walls is reduced—that is, the bottleneck—essentially perpendicularly to the connecting line between the two electrodes and over the entire height H of the expansion region. If the spark gap is triggered such that an arc is produced, the arc causes the adjoining isolating material in the line- or ribbon-shaped bottleneck to emit more gas than in the adjoining expansion region. This occurs because the arc is further removed from the side walls. As a result, two gas streams flowing out of the bottleneck into the adjoining expansion region are formed directed oppositely to one another. This leads, after the discharge process of the surge current, to a strengthened and faster deionization of the bottleneck, so that the danger of renewed triggering of the spark gap when line voltage is present is reduced.

In order to ensure varied cooling of the arc inside of the expansion region, by which means the arc voltage can likewise be influenced towards an arc voltage that is as constant as possible during the discharge process, it is preferably provided that at least the side walls of the expansion region in at least certain areas be composed of a hard, gassing insulation material—for example, polyoxymethylene (POM). Depending on the geometry of the arc combustion chamber, especially the expansion region, and the arrangement of regions of the side walls composed of gassing isolation material, different zones can be created in which the arc can be cooled to varying extents.

To specifically manipulate the stream of the hot, ionized gas inside of the arc combustion chamber and to enable a specific flow of the plasma out of the arc combustion chamber, it is provided, according to one embodiment variation of the invention, that in at least one of the side walls of the expansion region at least one opening be formed through which the hot, ionized gas can flow out of the arc combustion chamber. It is preferably provided thereby that multiple openings be arranged in one or both of the side walls, whereby the openings are then preferably arranged in a line perpendicular to the connecting line between the two electrodes. Through the formation of the openings, the pressure inside of the arc combustion chamber can be specifically reduced. Furthermore, additional cooling effects can be produced via the openings.

In order to ensure that the response voltage in the surge arrester according to the invention is, despite the relatively large distance between the end faces of the two electrodes, not too great, a trigger aid is provided by means of which the desired response voltage of the surge arrester can be chosen or set. In principle, the triggering of the spark gap can take place in different ways. For example, a trigger aid can be provided which comprises at least one trigger element and a trigger electrode. The trigger element and the trigger electrode thereby touch the arc combustion chamber, whereby the trigger element is electrically conductively connected on the one hand to the one electrode and on the other to the trigger electrode. From its basic structure, the trigger aid used in the surge arrester according to the invention can be constructed in the same manner as the trigger aid described in German Patent Application DE 103 38 835 A1.

According to a preferred configuration, the trigger aid arranged between the two electrodes has a longer resistive— that is, resistance-loaded—region and a short insulation region, whereby the resistive region is connected on the one hand to the one electrode and on the other to the insulation region. Thus, to trigger the spark gap, only the short insulation region must be crossed while the arc, after triggering, burns between the electrodes which are spaced substantially further apart from one another. As a result, the distance between the electrodes can be chosen to be so large that the arc voltage is greater than the expected line voltage, so that a system follow current can be quickly extinguished or so that the occurrence of a system follow current can even be completely prevented.

If the amplitude of the surge current to be discharged increases after the spark gap is triggered, the arc propagates into the expansion region and the plasma formed in the inner region likewise flows out of the small inner region into the larger expansion region. As the arc is now inside of the larger volume of the expansion region, the cooling effect of the side walls of the expansion region on the arc is now smaller, so that the arc voltage does not increase any further. At the end of the surge current to be discharged, when the amplitude of the same decreases once more, the blowing of the arc reduces due to the gases given off by the insulation material walls, as does the pressure generated by the arc itself inside of the arc combustion chamber, so that the expansion of the arc decreases. The arc then burns once more closer to the inner region of the arc combustion chamber—that is, closer to the triggering region, where the cooling is greater due to the side walls composed of insulating material. This can ensure that the arc voltage will not fall below the expected line voltage, even at the end of the discharge process.

Altogether, as a result a surge arrester is provided in which the conversion of energy produced during discharge of a surge current in the arc combustion chamber is reduced because the arc, during the discharge process, always takes on a form that is energetically favorable, so that the arc voltage remains approximately constant. Thanks to the relatively large axial distance between the end faces of the electrodes and to the configuration of the arc combustion chamber, the arc voltage is always above the expected line voltage—that is, it does not fall below a minimum value. One such minimum value for the arc voltage can, for example, lie in the range of 350 V to 450 V. In the surge arrester according to the invention, this can, for example, be realized with a distance a between the end faces of the electrodes that lies between 5 mm and 20 mm.

In particular, there are now a number of possible ways to configure and further develop the surge arrester according to the invention as will become apparent from the following description of a preferred embodiment in connection with the accompanying drawings.

DETAILED DESCRIPTION OF THE INVENTION

Figure 1A:
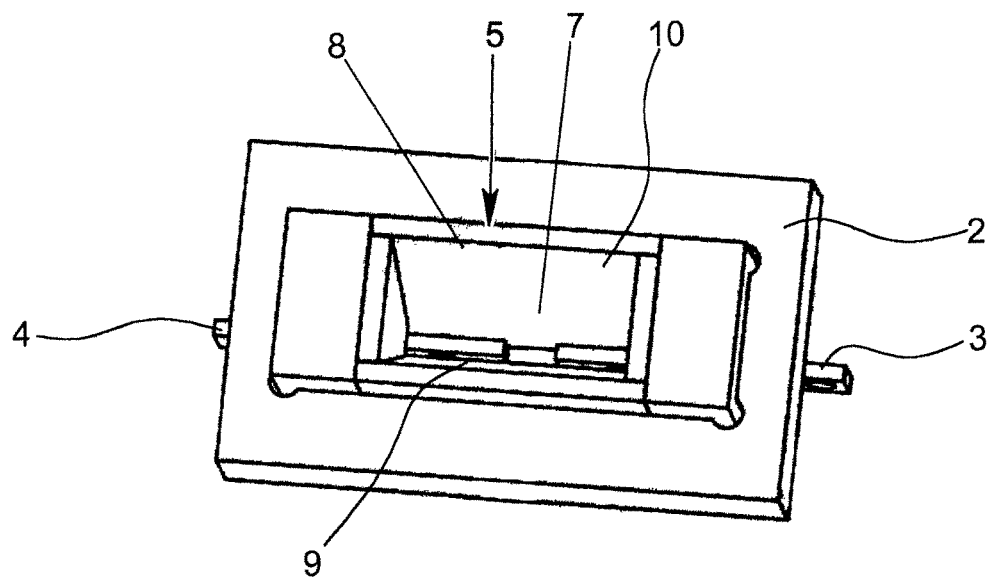
FIGS. 1a & 1b are simplified perspective plan and sectional views of a surge arrester.
Figure 1B:
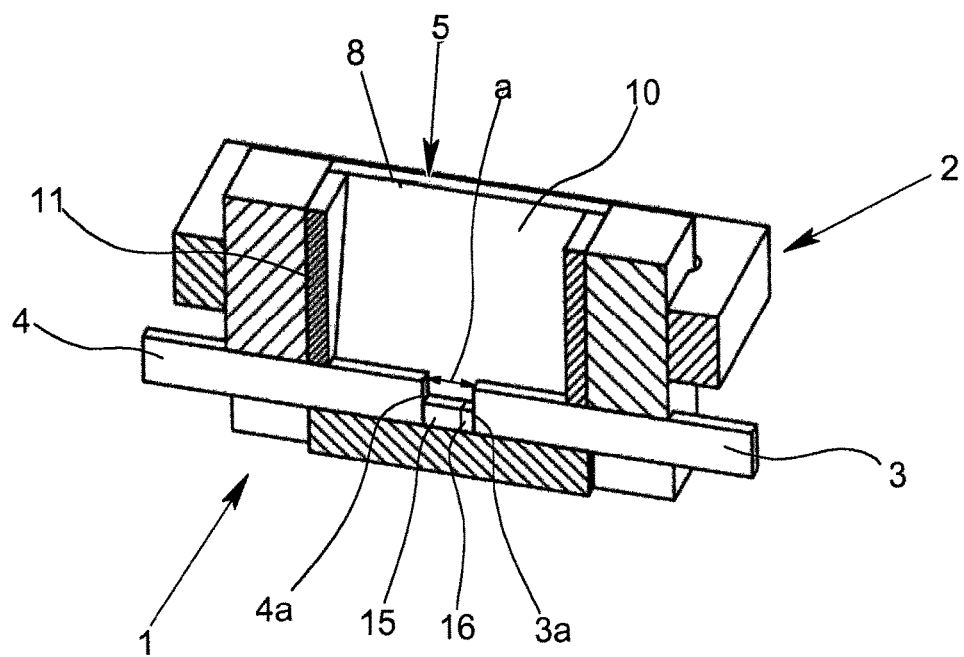

FIG. 1 shows a simplified depiction of a surge arrester 1 according to the invention—once in a perspective depiction diagonally from above (FIG. 1a) and once in a perspective depiction diagonally from the side—of a surge arrester 1 cut open lengthwise (FIG. 1b). The surge arrester 1 has a housing 2 with two electrodes 3, 4 which are situated axially opposite one another, and an arc combustion chamber 5 which is formed in the interior of the housing 2. The simplified depiction of the surge arrester according to FIG. 1 shows thereby only one part of the housing 2, whereby in particular the housing part that closes off the housing 2 at the top is omitted, so that a view into the arc combustion chamber 5 formed in the interior of the housing 2 is possible. In addition to the housing 2 (shown only schematically in the figures), the surge arrester 1 may additionally have an outer housing as well, which housing is composed of, for example, steel, by which means a high pressure resistance can be ensured.

A spark gap is formed between the two electrodes 3, 4, so that an arc 6, indicated in the FIGS. 2 to 7, is created when the spark gap between the two electrodes 3, 4 is triggered. In order to prevent the occurrence of a system follow current or to extinguish a flowing system follow current as quickly as possible, the axial distance a between the end faces 3a, 4a of the two electrodes 3, 4 which are situated opposite to one another, is selected to be so large that the arc voltage $U_L$ is greater than the expected line voltage $U_N$. The distance a between the end faces 3a, 4a of the two electrodes 3, 4 can thereby amount to between 5 mm and 20 mm.

As the simplified depictions of the surge arrester 1 according to the invention show, the arc combustion chamber 5 has an inner region 7 and at least one expansion region 8 into which a pending arc 6 can propagate after triggering. In the embodiment examples of the surge arrester 1 shown in FIGS. 1 to 4, only one expansion region 8 is formed in the arc chamber 5 in each case, while in the embodiment examples according to FIGS. 5 to 7 the arc combustion chamber 5 has two expansion regions 8, 8', which adjoin two longitudinal sides of the inner region 7 that are situated opposite one another.

As is, for example, visible in FIG. 1b, the inner region 7 of the arc combustion chamber 5, which is arranged between the two electrodes 3, 4 and is axially delimited by their end faces 3a, 4a, turns into the substantially larger expansion region 8—that is, the inner region 7 is connected to the expansion region 8 along its entire longitudinal side and not just via a narrow channel. Altogether, the arc combustion chamber 5 has, as a result, a substantially larger volume than the surge arresters known from the state of the art, in which the arc combustion chamber is normally cylindrical, whereby the diameter of the arc combustion chamber normally corresponds to the dimensions of the end faces of the electrodes.

In the surge arrester 1 according to the invention, at least the two side walls 9, 10 of the expansion region 8 are at least partially composed of insulating material 11. Preferably, the side walls as well as the end faces of the expansion region 8 are wholly composed of insulating material, so that the arc combustion chamber 5 is completely surrounded by insulating material.

Figure 2:
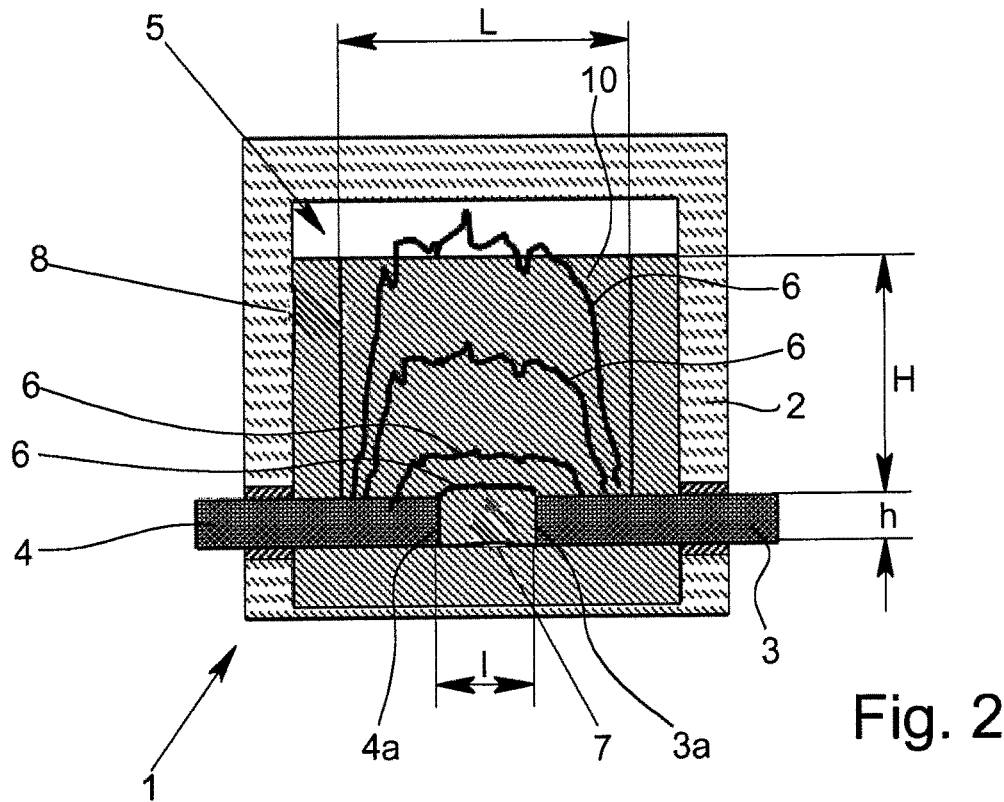
FIG. 2 is a longitudinal section through a surge arrester.

FIG. 2 schematically shows that, in a surge arrester 1 according the invention, the arc 6 can propagate varyingly far into the expansion region 8 of the arc combustion chamber 5, depending on the instantaneous current strength of the surge current to be discharged. The greater the amplitude of the surge current, the further the arc 6 will normally propagate into the expansion region 8 of the arc combustion chamber 5. This is possible because the arc combustion chamber 5 is not limited to the inner region 7 between the two electrodes 3, 4 but rather has in the expansion region 8 an additional large region which extends perpendicularly to the connecting line between the two electrodes 3, 4, by which means a relatively high-volume gap or insulation room for the arc 6 is made available. As a result, it is possible for the arc 6 to always propagate inside of the arc combustion chamber 5 such that it takes on a form that is energetically most favorable, so that the arc voltage during a rise in the amplitude of the surge current does not increase or only increases relatively little. By this means, a linearization of the arc voltage during the discharge process is achieved, so that the conversion of energy inside of the arc combustion chamber 5 is also as low as possible.

Figure 3:
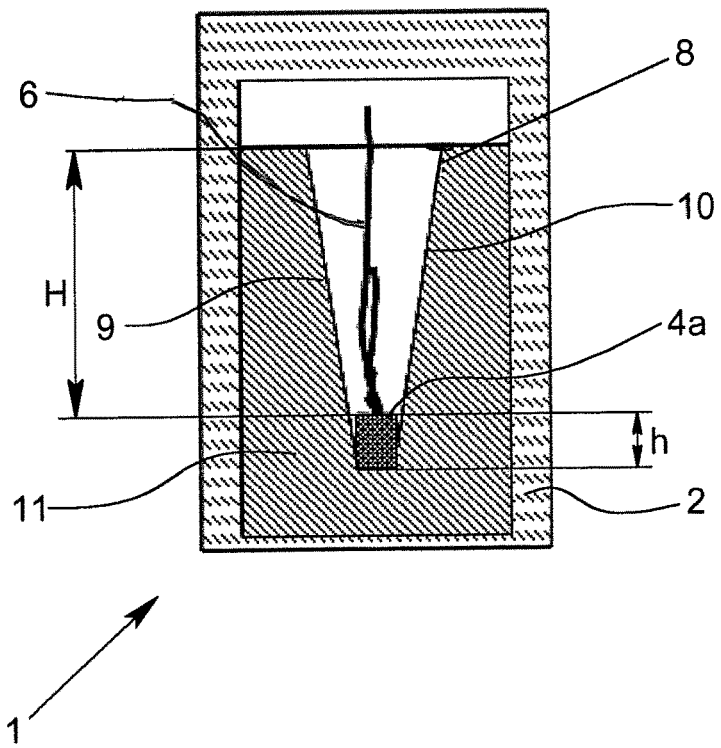
FIG. 3 is a cross-sectional view taken at a right angle to the view of FIG. 2, FIGS. 4a-4e show five different embodiments of the arc combustion chamber of a surge arrester.

As FIGS. 2 and 3 also especially show, the expansion region 8 has a height H which is substantially greater than the height h of the inner region 7 of the arc combustion chamber 5. Additionally, the expansion region 8 has, according to FIGS. 1 and 2, a length L which is greater than the length l of the inner region 7, whereby the length l of the inner region corresponds to the distance a between the end faces 3a, 4a of the two electrodes 3, 4. The two electrodes 3, 4 consequently protrude with not only their end faces 3a, 4a, but also a corresponding length into the arc combustion chamber 5, so that the two electrodes 3, 4 adjoin with their longitudinal sides—the upper side, in the figures—the expansion region 8. This makes it possible for the bottoms of the arc 6—as shown in FIG. 2.—to wander outward on the longitudinal side of the two electrodes 3, 4 after triggering.

FIGS. 4a to 4d depicts different variants of the arc combustion chamber 5 in cross section. These differ from each other in the configuration of the expansion region 8 or the formation of the side walls 9, 10 of the expansion region 8. In each of the variants according to FIGS. 4a to 4d, the expansion region 8 has, in each case, a larger width in the upper region than in the lower region. The enlargement of the expansion region 8 can thereby be linear (FIG. 4a), so that the expansion region 8 has a somewhat V-shaped cross section. Additionally, an arched (FIGS. 4b and 4c) or a step-shaped (FIG. 4d) progression of the side walls 9, 10 is possible. The two embodiment examples according to FIGS. 4b and 4c differentiate themselves in that the expansion region 8 in the embodiment example according to FIG. 4b has, somewhat above the inner region 7, a region 12, in which the distance between the side walls 9, 10 of the expansion region 8 is reduced, while the expansion region 8 in the embodiment example according to FIG. 4c broadens continually from the inner region 7 up to its upper edge.

Figure 4A:
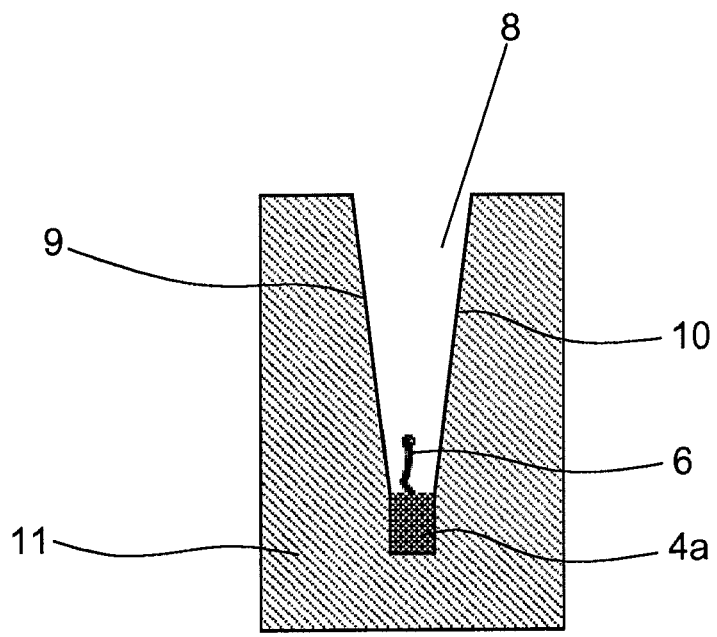
Figure 4B:
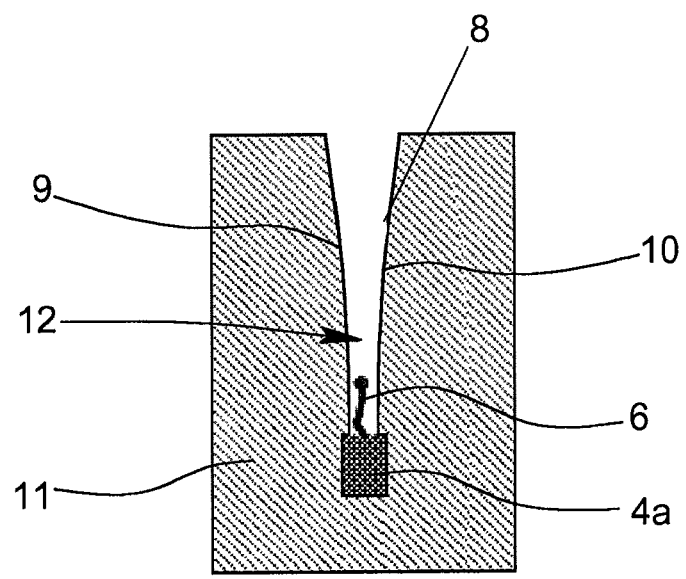
Figure 4C:
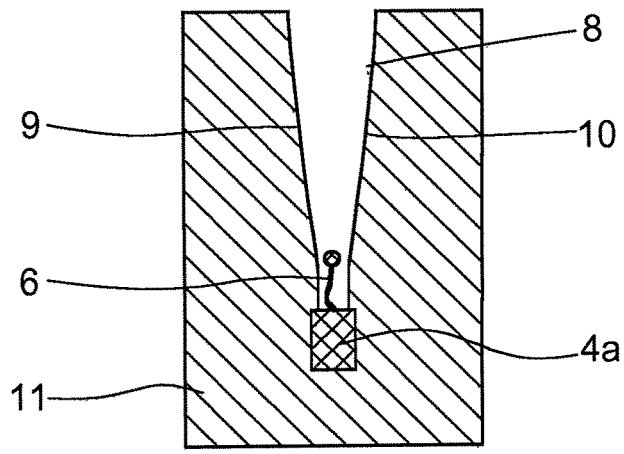
Figure 4D:
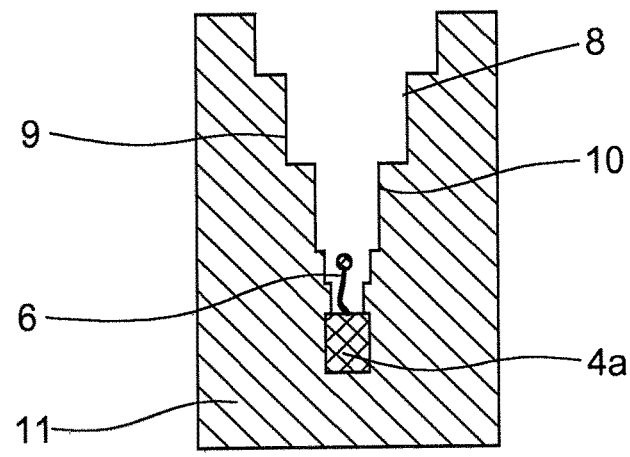
Figure 4E:
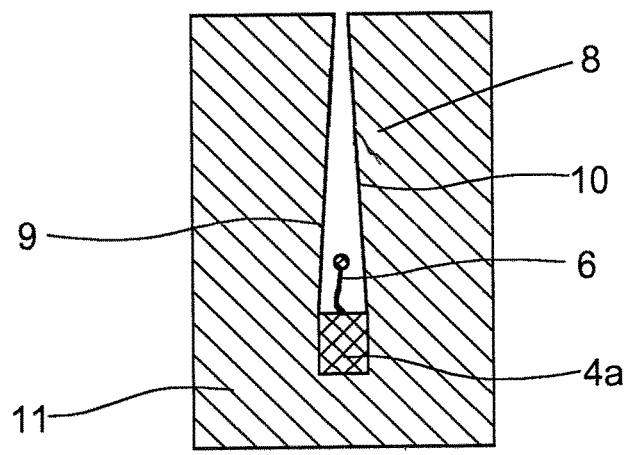

FIG. 4e shows an embodiment example in which the expansion region 8 diminishes in cross section from the inner region 7 toward its upper end. Because the expansion region 8 has a longer length L than the inner region 7 in this embodiment example as well, a configuration of this sort of the expansion region 8 or of the arc combustion chamber 5 also makes possible a widening of the arc 6 during a rise in the surge current to be discharged. The shorter distance between the side walls 9, 10, realized in the upper part of the expansion region 8, leads, in this area, to a stronger cooling of an arc 6, which counteracts a further widening of the arc 6. As a result, excessive extension of an arc 6 (which is connected with an increase in the arc voltage) is prevented.

In the end, the different geometric configurations of the arc combustion chamber 5, shown in the figures, all make it possible for an arc 6 to propagate into the expansion region 8 in such a way that it takes on its energetically most favorable form, so that the arc voltage remains approximately constant, even during a rise in the amplitude of the surge current to be discharged. By appropriately dimensioning the arc combustion chamber 5, especially by means of a respective choice of the axial distance a between the end faces 3a, 4a of the two electrodes 3, 4, it can be ensured that the arc voltage $U_L$ is always somewhat above the expected line voltage $U_N$.

Figure 5A:
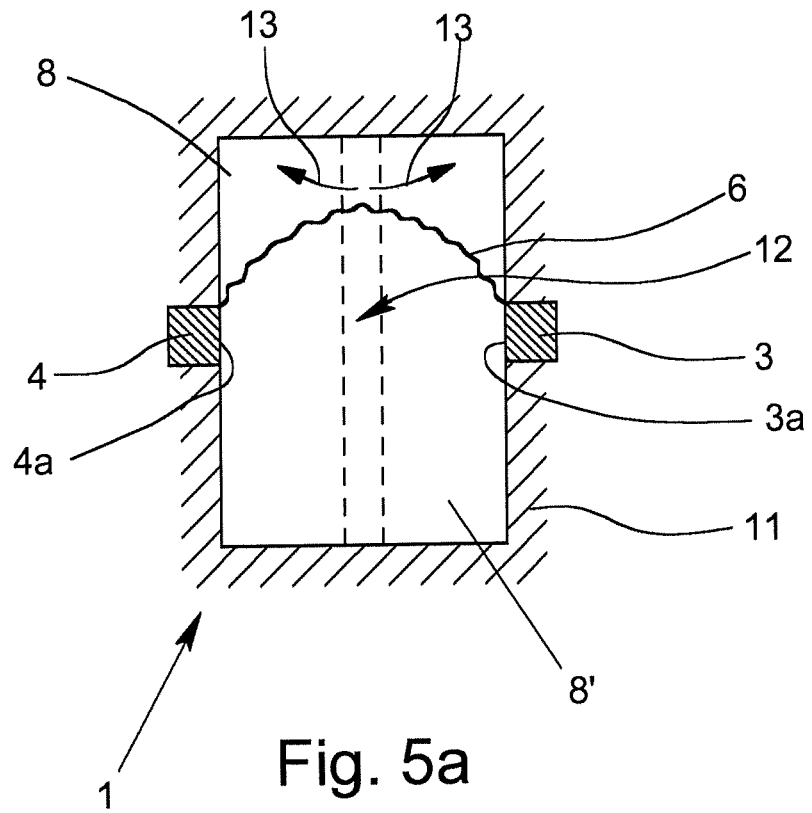
FIGS. 5a & 5b are simplified depictions of a further embodiment of a surge arrester, in a longitudinal section and from above.
Figure 5B:
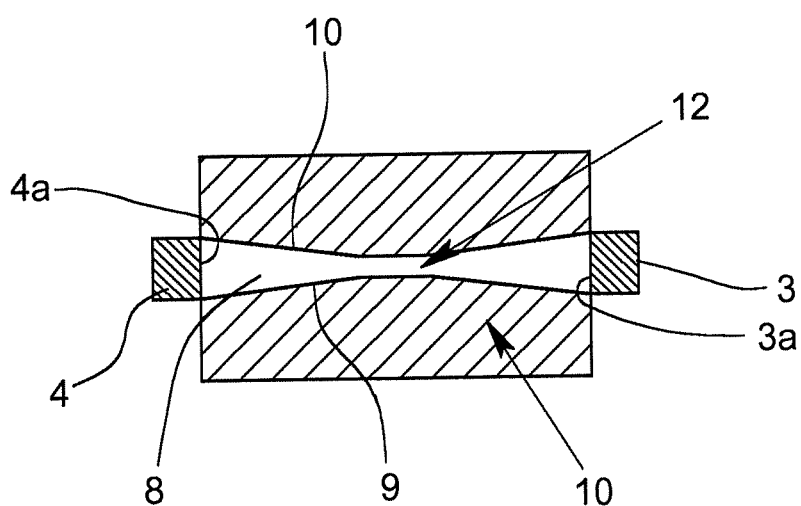

In the embodiment example according to FIGS. 5a & 5b the region 12, in which the distance between the side walls 9, 10 of the expansion region 8 is reduced, extends perpendicularly to the connecting line between the two electrodes 3, 4 and over the entire height of the two expansion regions 8, 8' or the arc combustion chamber 5. The line- or ribbon-shaped region 12, which constitutes a bottleneck for the arc 6, is thereby formed centrally between the end faces 3a, 4a of the two electrodes 3, 4. The shorter distance between an arc 6 and the two side walls 9, 10 in the region 12 that is, inside of the bottleneck—causes the side walls 9, 10 in the region 12 to emit more gas than in the adjoining expansion region 8, in which the arc 6 is further from the side walls 9, 10. This leads to two gas streams 13—indicated in FIG. 5a with arrows—directed oppositely to one another out of the bottleneck 12 into the adjoining expansion region 8. The two gas streams 13 lead, after the discharge process of the surge current, to a strengthened and quicker deionization of the region 12, so that the danger of a renewed triggering of the spark gap in the case of pending line voltage is reduced.

Figure 6:
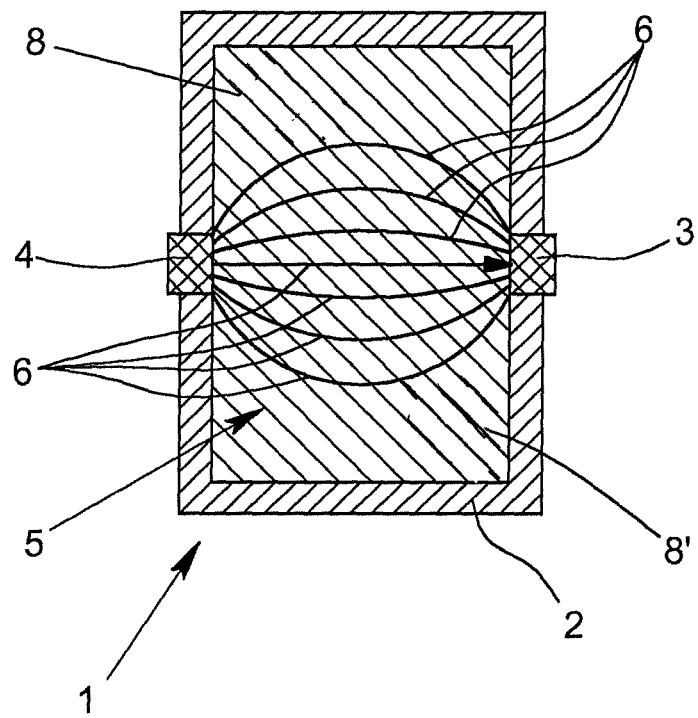
FIG. 6 is a simplified longitudinal sectional view of a further embodiment of a surge arrester.
Figure 7:
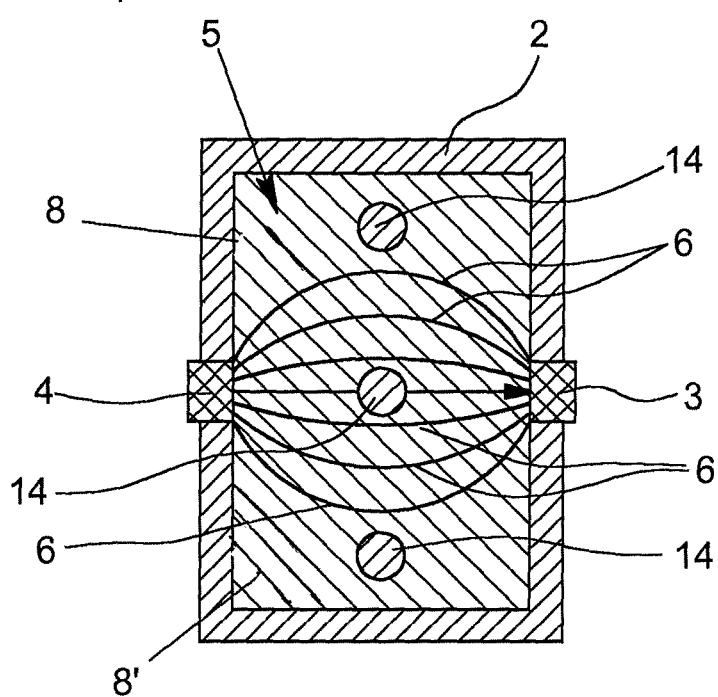
FIG. 7 is a simplified longitudinal sectional view of an alternative embodiment of the surge arrester according to FIG. 6.

In the two embodiment variations of the surge arrester 1 or the arc combustion chamber 5 according to the FIGS. 6 and 7, the arc combustion chamber 5 has two expansion regions 8, 8', which adjoin two longitudinal sides of the inner region 7 which are situated opposite to one another. The two electrodes 3, 4 are thereby arranged centrally in the arc combustion chamber 5, so that the two expansion regions 8, 8' have the same dimensions and are symmetrically arranged with regard to the inner region 7.

To specifically manipulate the stream of the hot, ionized gas inside of the arc combustion chamber 5 and to enable a specific flow of the plasma out of the arc combustion chamber 5, openings 14 are formed in the side walls 9, 10 of the inner region 7 as well as the expansion regions 8, 8' in the embodiment variation according to FIG. 7, through which openings hot, ionized gas can flow out of the arc combustion chamber 5. Furthermore, the pressure inside of the arc combustion chamber 5 can be specifically reduced or set by means of the formation of the openings 14. Moreover, additional cooling effects can be achieved by means of the formation of the openings 14 and the gas streams created thereby.

Because, in the surge arrester 1 according to the invention, the distance a between the end faces 3a, 4a of the two electrodes 3, 4 is selected to be so large that the arc voltage $U_L$ is greater than the expected line voltage $U_N$, a trigger aid is provided in the region of the arc combustion chamber 5, by means of which the desired response voltage of the surge arrester 1 can be adjusted. In the embodiment example shown in FIG. 1, the trigger aid comprises a resistive area 15 and a short insulation area 16, whereby the resistive area 15 is connected on the one side to the one electrode 4 and on the other side to the insulation region 16. In addition, however, other types of known (known per se from the state of the art) trigger aids can be employed which lead to a triggering of the surge arrester 1 at the desired response voltage.

What is claimed is:

1. A surge arrester for power supplies of low-voltage systems, comprising:
   a housing,
   two electrodes which are situated axially opposite one another,
   an arc combustion chamber formed within the housing, and
   a trigger aid, wherein a spark gap is formed between the electrodes so that an arc is produced when the spark gap between the two electrodes is triggered, wherein an axial distance a between end faces of the electrodes is so large that the arc voltage $U_L$ is greater than an expected line voltage $U_N$, wherein the arc combustion chamber has an inner region and at least one expansion region into which the arc can propagate after triggering, wherein the inner region is arranged between the two electrodes and is axially delimited by the end faces of the electrodes, wherein the at least one expansion region adjoins a longitudinal side of the inner region, and at least two side walls of the expansion region are at least partially composed of insulating material, and wherein a longitudinal side of the inner region that is situated opposite the expansion region is closed.

2. The surge arrester according to claim 1, wherein the expansion region has a height which is greater than the height of the inner region.

3. The surge arrester according to claim 1, wherein the expansion region has a length which is greater than the length of the inner region, whereby a longitudinal side of at least one of the electrodes adjoins the expansion region.

4. The surge arrester according to claim 1, wherein the expansion region, in cross section, expands from the inner region outwards.

5. The surge arrester according to claim 1, wherein the side walls of the expansion region are configured in a manner such that the expansion region has an area in which a distance between the side walls is reduced relative to other areas of the expansion region.

6. The surge arrester according to claim 5, wherein the area in which the distance between the side walls is reduced extends essentially perpendicularly relative to a connecting line between the two electrodes and over an entire height of the expansion region, whereby a line-shaped or ribbon-shaped region is formed centrally between the end faces of the two electrodes.

7. The surge arrester according to claim 1, wherein at least one opening is formed in at least one of the side walls of the expansion region, through which opening hot, ionized gas can flow out of the arc combustion chamber.

8. The surge arrester according to claim 1, wherein insulating material is a hard gassing insulation material.

9. The surge arrester according to claim 1, wherein the trigger aid has a resistive area and a short insulation area, the resistive area being connected on one side to one of the electrodes and on another side to the insulation area.

10. The surge arrester according to claim 1, wherein the side walls of the expansion region and the inner region of the arc combustion chamber, except in a region of the trigger aid, are composed of the insulating material.

* * * * *